(12) United States Patent
Ou et al.

(10) Patent No.: US 8,774,076 B2
(45) Date of Patent: Jul. 8, 2014

(54) OPTIMIZING OTV MULTICAST TRAFFIC FLOW FOR SITE LOCAL RECEIVERS

(75) Inventors: Heidi H. Ou, Saratoga, CA (US); Richard William Bradford, Lancaster, MA (US)

(73) Assignee: Cisco Technology, Inc., San Jose, CA (US)

( * ) Notice: Subject to any disclaimer, the term of this patent is extended or adjusted under 35 U.S.C. 154(b) by 324 days.

(21) Appl. No.: 13/021,518

(22) Filed: Feb. 4, 2011

(65) Prior Publication Data
US 2012/0201244 A1 Aug. 9, 2012

(51) Int. Cl.
*H04L 12/28* (2006.01)
*H04J 3/26* (2006.01)

(52) U.S. Cl.
USPC .............................. 370/312; 370/390; 370/432

(58) Field of Classification Search
None
See application file for complete search history.

(56) References Cited

U.S. PATENT DOCUMENTS

| | | | | |
|---|---|---|---|---|
| 6,671,276 B1* | 12/2003 | Bakre et al. | ................. | 370/395.1 |
| 7,512,124 B2* | 3/2009 | Sangroniz et al. | ............ | 370/390 |
| 7,564,817 B2* | 7/2009 | Abeta et al. | .................... | 370/331 |
| 7,969,980 B1* | 6/2011 | Florit et al. | .................... | 370/390 |
| 8,166,205 B2* | 4/2012 | Farinacci et al. | ............. | 709/249 |
| 8,184,628 B2* | 5/2012 | Cai et al. | ........................ | 370/389 |
| 8,243,643 B2* | 8/2012 | Boers et al. | .................... | 370/312 |
| 8,339,996 B2* | 12/2012 | Wijnands et al. | ............. | 370/256 |
| 2008/0219260 A1* | 9/2008 | Du et al. | ........................ | 370/390 |
| 2009/0245248 A1* | 10/2009 | Arberg et al. | ................. | 370/390 |
| 2011/0051727 A1* | 3/2011 | Cai et al. | ....................... | 370/390 |
| 2011/0075663 A1* | 3/2011 | Serbest | ......................... | 370/390 |
| 2012/0051358 A1* | 3/2012 | Bellagamba et al. | ......... | 370/390 |
| 2012/0182885 A1* | 7/2012 | Bradford et al. | .............. | 370/252 |

OTHER PUBLICATIONS

Miller, "Cisco OTV: Virtually Spanning Data Centers", http://www.datacenterknowledge.com/archives/2010/02/07/cisco-otv-moving-vms-across-data-centers/, Feb. 7, 2010, 3 pgs.
Grover, et al., "Overlay Transport Virtualization", draft-hasmit-otv-00, Internet-Draft, Network Working Group, Cisco Systems, Apr. 13, 2010, 17 pgs.

* cited by examiner

*Primary Examiner* — Hassan Phillips
*Assistant Examiner* — Hicham Foud
(74) *Attorney, Agent, or Firm* — Novak Druce Connolly Bove + Quigg LLP (57) ABSTRACT

In one embodiment, a first Edge Device may join a multicast group via a multicast router, wherein the first Edge device is in a first site of a network and the multicast router is in a second site of the network. The first Edge Device may ascertain an existence of both a first multicast source in the first site of the network and a second multicast source in the second site of the network. The first Edge Device may select the first multicast source as a multicast source from which to receive multicast data for the multicast group. The first Edge Device may notify the second multicast source in the second site of the network that the first Edge Device is not interested in receiving multicast data for the multicast group from the second multicast source.

24 Claims, 9 Drawing Sheets

OPTIMIZING OTV MULTICAST TRAFFIC FLOW FOR SITE LOCAL RECEIVERS

BACKGROUND

1. Technical Field

The present disclosure relates generally to optimizing the transmission of multicast data in a communication network and more particularly, to optimizing the transmission of multicast data from a multicast source to receivers that are in the same network site as the multicast source.

2. Description of the Related Art

Businesses often maintain a private network that is accessible via multiple business sites in different geographical locations. Each of these sites may support any number of users. In addition, each of the sites may store data or provide services that may be accessed at one or more of the sites.

Unfortunately, transmitting multicast traffic from one site to another site often results in an undesirable delay and inefficient bandwidth usage.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order to simplify the description.

Overview

In one embodiment, a first Edge Device may join a multicast group via a multicast router, wherein the first Edge device is in a first site of a network and the multicast router is in a second site of the network. The first Edge Device may ascertain an existence of both a first multicast source in the first site of the network and a second multicast source in the second site of the network. The first Edge Device may select the first multicast source as a multicast source from which to receive multicast data for the multicast group. The first Edge Device may notify the second multicast source in the second site of the network that the first Edge Device is not interested in receiving multicast data for the multicast group from the second multicast source.

Specific Example Embodiments

IP Multicast

Internet Protocol (IP) multicast is a technique for one-to-many and many-to-many real-time communication over an IP infrastructure in a network. An entity requesting multicast messages from a particular multicast group may be referred to as a receiver or host. The receiver may be implemented via a program installed on the receiver. The receiver may, for example, be a desktop computer, laptop computer, or a hand-held device such as a cell phone.

IP multicast scales to a larger receiver population by not requiring prior knowledge of who or how many receivers there are. Multicast uses network infrastructure efficiently by enabling a source of multicast packets to send a packet only once, even if it is to be delivered to a large number of receivers. Nodes in the network (e.g., network switches and routers) may replicate the packet to reach multiple receivers such that messages are sent over each pertinent link of the network only once.

A variety of multicast protocols are available. The most common low-level protocol to use multicast addressing is User Datagram Protocol (UDP). By its nature, UDP is not reliable—messages may be lost or delivered out of order. Reliable multicast protocols such as Pragmatic General Multicast (PGM) have been developed to add loss detection and retransmission on top of IP multicast.

An IP multicast group address is used by sources and the receivers to send and receive multicast messages. Sources use the group address as the IP destination address in their data packets. Receivers use this group address to inform the network that they are interested in receiving packets sent to that group. The protocol typically used by receivers to join a group is called the Internet Group Management Protocol (IGMP).

With routing protocols based on shared trees, once the receivers join a particular IP multicast group, a multicast distribution tree is constructed for that group. The protocol most widely used for this is Protocol Independent Multicast (PIM). PIM sets up multicast distribution trees such that data packets from senders to a multicast group reach all receivers which have joined the group. IP multicast operation does not require an active source to know about the receivers of the group.

Network Configuration

A private network of a company or business may be referred to as an enterprise network. An enterprise network may be implemented as a Virtual Private Network (VPN). A VPN may use a public network, such as the Internet, to transmit private data. Geographically disparate portions (e.g., sites) of the VPN may be connected via the Internet. However, the data sent across the Internet may be encrypted. In this manner, a VPN may provide secure, remote access to an enterprise network.

Within the Internet, an autonomous system (AS) may be a collection of connected IP routing prefixes (e.g., including routers and links) under the control of a common entity or administration (e.g., enterprise network or service provider network) that presents a common, clearly defined routing policy to the Internet. A unique Autonomous System Number (ASN) is allocated to each AS for use in Border Gateway Protocol (BGP) routing. Therefore, the ASNs may uniquely identify each network on the Internet.

Each AS may include one or more border routers. A border router may be a router that has connections to devices in more than one AS. Each geographically disparate network site of an enterprise network may be implemented by a different AS. Each distinct network site may therefore include one or more border routers, which may be referred to as "Edge Devices."

Interior Gateway Protocol (IGP) is a routing protocol that may be deployed inside an AS and used to create routing schemes including nodes (e.g., routers) and links that form the network topology through which IP packets are routed/forwarded. Example IGPs include Open Shortest Path First (OSPF, a link-state routing protocol), Intermediate System to Intermediate System (ISIS, another link-state routing protocol), Enhanced Interior Gateway Routing Protocol (EIGRP), and Routing Information Protocol (RIP). As will be described in further detail below, an IGP may be used to optimize multicast traffic flow for multicast traffic sent by a multicast source located in the same network site as one or more receivers of the multicast traffic (e.g., where a second multicast source is located in another network site).

One or more of the network sites may include a data center. Therefore, the disclosed embodiments may be implemented in a system having geographically distributed data centers. A data center may be a facility used to house computer systems and associated components, such as telecommunications and storage systems.

In accordance with various embodiments, an enterprise network may support one or more Virtual Local Area Networks (VLANs) across one or more network sites. When packets are transmitted, the packets are given a VLAN Identifier (ID) at their origin so that they may be properly processed as they pass through the network. The VLAN ID may then be used to enable routing and switching engines to make appropriate decisions.

Various embodiments may be implemented in a system implementing Overlay Transport Virtualization (OTV). OTV may be used to connect segments of a single broadcast domain (e.g., VLAN) across a Wide Area Network (WAN). One common use of OTV is to inter-connect data centers.

Example Embodiments

A user connected to one network site (e.g., LAN) of an enterprise network (e.g., VPN) may wish to receive multicast traffic, where a source of the multicast traffic is located in another network site (e.g., LAN) of the enterprise network. The delays that typically occur as a result of transmission of multicast traffic from a multicast source in one network site of an enterprise network over a network such as a Wide Area Network (WAN) to a receiver in another network site of the enterprise network will be described in further detail with reference to FIG. 1A.

Figure 1A:
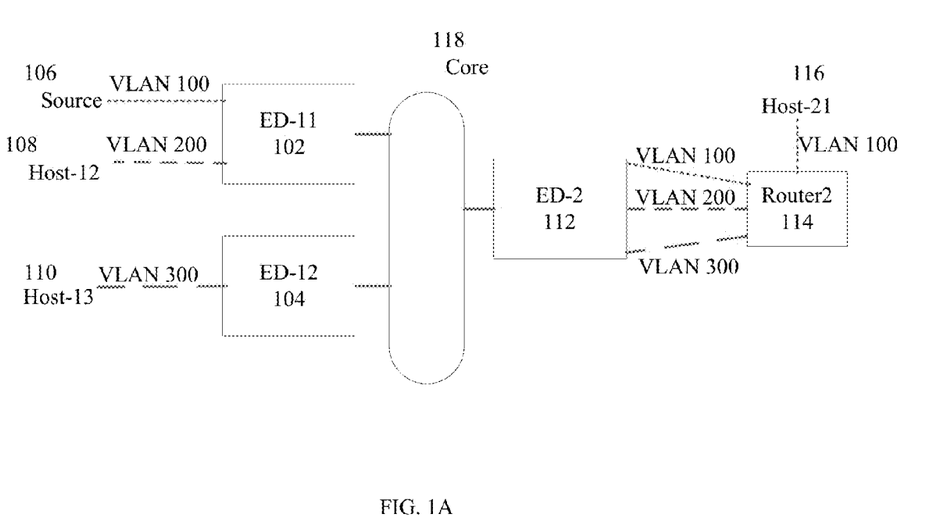
FIGS. 1A-B are diagrams illustrating an example system in which various embodiments may be implemented.

FIG. 1A is an example system in which various embodiments may be implemented for a particular entity (e.g., business, company, etc.) having two or more geographically disparate sites. As shown in FIG. 1A, a first site may include a first Edge Device (ED), ED-1 1 102, and a second Edge Device, ED-1 2 104. Each Edge Device may support one or more VLANs. In this example, the first Edge Device, ED-1 1 102, may support two or more different Virtual Local Area Networks (VLANs). More particularly, in this example, a Source 106 is in a first VLAN, VLAN 100, and a first receiver (e.g., host), Host-1 2 108, is in a second VLAN, VLAN 200. The second Edge Device, ED-1 2 104, may support a third VLAN, VLAN 300. More particularly, in this example, a second receiver, H-1 3, is in the third VLAN, VLAN 300.

A second site may include a third Edge Device, ED-2 112, and a multicast router, Router2 114. The second site may also be referred to as a remote site. As shown in FIG. 1A, the multicast router, Router2 114, may be connected to each of the three VLANs, VLAN 100, VLAN 200, and VLAN 300. In addition, a third receiver, Host-21 116, may be in the first VLAN, VLAN 100, and may be connected to the multicast router, Router2 114.

Since the Source 106 is in the first site and the multicast router, Router 2 114, is in the second site, multicast packets are typically sent by the Source 106 in the first site over a core network 118 such as WLAN to the multicast router, Router 2 114, in the second site via the first VLAN, VLAN 100. In addition, since there are receivers in the first site, the multicast router, Router 2 114, typically replicates packets and sends the packets to the VLANs of the receivers, VLAN 200 and VLAN 300 and back to the first site via the same network 118.

More particularly, multicast traffic for a group G will typically be sent by the Source 106 over the first VLAN, VLAN 100, to the first Edge Device, ED-1 1 102. The first Edge Device, ED-1 1 102, will then send the multicast traffic over the network 118 to the third Edge Device, ED-2, 112, located in the second site. The third Edge Device, ED-2, 112, located in the second site, then sends the multicast traffic over the first VLAN, VLAN 100, to the multicast router, Router 2 114.

The multicast router, Router 2 114, will then send the multicast traffic to the two receivers in the first site. More particularly, in order to send the multicast traffic to the first receiver, Host-12 108, the multicast router, Router 2 114, sends the multicast traffic over the second VLAN, VLAN 200, to the third Edge Device, ED-2 112. The third Edge Device, ED-2 112, then sends the multicast traffic over the network 118 to the first Edge Device, ED-11 108. The first Edge Device, ED-11 108, then sends the multicast traffic over the second VLAN, VLAN 200, to the first receiver, Host-12 108.

In order to send the multicast traffic to the second receiver, Host-13 110, the multicast router, Router 2 114, sends the multicast traffic over the third VLAN, VLAN 300, to the third Edge Device, ED-2 112. The third Edge Device, ED-2 112, then sends the multicast traffic over the network 118 to the second Edge Device, ED-12 104. The second Edge Device, ED-12 110 then sends the multicast traffic over the third VLAN to the second receiver, Host-13 110.

As described above, a multicast packet in the above example typically traverses the network 118 three times: once from the Source to the multicast router, and the other two times from the multicast router to reach the receivers. While it is possible to configure the local Edge Devices to route multicast traffic to reduce the number of times a multicast packet traverses the network 118, this would increase the complexity of the system, as well as the maintenance overhead.

The disclosed embodiments enable multicast traffic to be forwarded within the same site in order to reduce traffic in the core network. Although the first network site in the example shown in FIG. 1A includes two Edge Devices, this is merely illustrative. Therefore, the disclosed embodiments may also be implemented in a site that includes a single Edge Device or a greater number of Edge Devices.

Figure 1B:
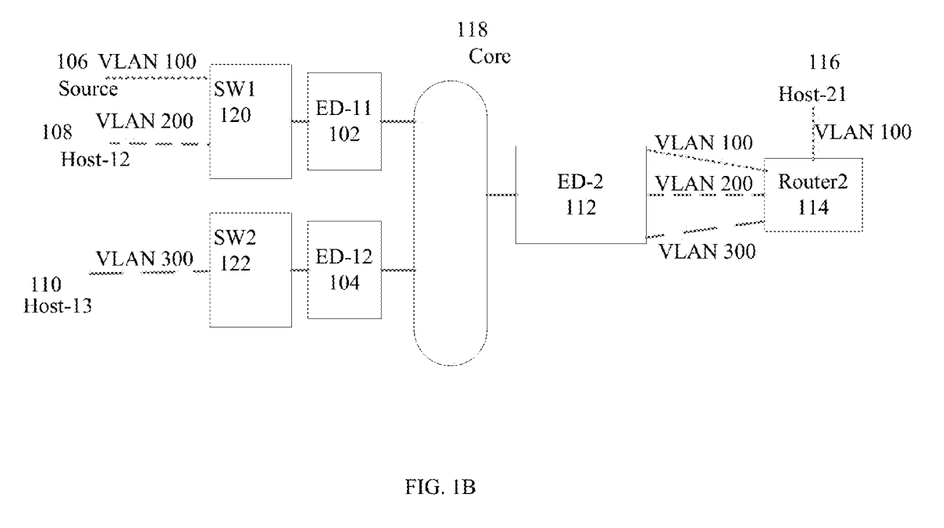

In accordance with various embodiments, one or more switches may be added to the first site to enable multicast traffic to be forwarded locally within the first site by the Source 106 to the first receiver, Host-12 108, and the second receiver, Host-13 110. More particularly, as shown in FIG. 1B, a first switch, SW1 120, may connect the first Edge Device, ED-11 102 to the Source 106 and the first receiver, Host-12 108. In addition, a second switch, SW2 122, may connect the second Edge Device, ED-12 110, to the second receiver, Host-13 110. Moreover, the first switch SW1 120 may be connected to the second switch SW2 122 directly, or may be coupled to the second switch SW 122 via one or more other devices on the first site.

Assume that the multicast router, Router 2 114, uses the third Edge Device, ED-2 112, and VLAN 200 to send the multicast packets to receivers in VLAN 200, and uses the third Edge Device, ED-2 112, and VLAN 300 to send the multicast packets to receivers in VLAN 300. In a conventional system, the Source 106 of the multicast traffic in the first site would send multicast packets using VLAN 100 across the network 118 (e.g., WLAN) to the remote multicast router, Router2 114, for replication on VLANS 200 and 300. The multicast packets would then be retransmitted across the network twice more (once for each of the two VLANs).

In accordance with the disclosed embodiments, multicast traffic flows may be optimized within a site that includes both a multicast source and one or more receivers. As a result, delays typically present when forwarding multicast traffic may be reduced. The multicast source and receiver(s) may be connected or coupled to one or more Edge Devices. More particularly, the multicast source and the receiver(s) may be connected to separate Edge Devices, or the same Edge Device. Accordingly, it is unnecessary to configure ports of the Edge Devices on a per VLAN basis.

Each of the Edge Devices and receivers may support an operating system such as Internetwork Operating System (10S) or NX-OS. Thus, each of the Edge Devices and receivers in each of the sites may support a multicast protocol that enables them to join a multicast group G in accordance with the operating system supported by the devices. More particularly, various communication protocols enable devices to establish multicast group memberships. For example, Internet Group Management Protocol (IGMP) enables receivers and routers running the IOS operating system on Internet Protocol (IP) networks to establish multicast group memberships. Similarly, a Protocol Independent Multicast (PIM) refers to a family of multicast routing protocols for IP networks that provide one-to-many and many-to-many distribution of data over a Local Area Network (LAN), Wide Area Network (WAN), or the Internet. PIM uses routing information supplied by other traditional routing protocols such as the Border Gateway Protocol (BGP).

Generally, there are three messages types that are used in IGMP: Membership Query, Membership Report, and Leave Group. Membership Query (IGMP Query) messages are used by multicast enabled routers running IGMP to discover which hosts on attached networks are members of which multicast groups. A Membership Report (IGMP Join) message may be sent by a host whenever it joins a multicast group, and when responding to Membership Queries sent by an IGMP device (e.g., router). A Leave Group (IGMP Leave) message is sent when a host leaves a multicast group.

In PIM, routers including Edge Devices use PIM Join messages to join a multicast group, and PIM Prune messages to leave a multicast group. A PIM Hello message is multicast periodically on each of its multicast (PIM) enabled interfaces to all PIM routers. When a PIM Hello message is received, information gathered from the PIM Hello message may be used to determine neighbor adjacencies and generate mappings accordingly.

In accordance with various embodiments, Edge Devices (e.g., ED-11, ED-12, and ED-2) and receivers (e.g., Host-11, Host-12, and Host-2) may each send either an Internet Group Management Protocol (IGMP) Join or a PIM Join to join a particular multicast group. Similarly, in order to leave a multicast group, Edge Devices may send an IGMP Leave or a PIM Prune message. In order to attract multicast traffic to themselves, Edge Devices may send an IGMP Query or a PIM Hello.

Various embodiments are described below with reference to IGMP. However, it is important to note that the disclosed embodiments may also be implemented through the use of another protocol such as PIM.

In addition, the Edge Devices may support an IGP such as a link-state protocol that enables the Edge Devices to communicate with one another. Link-state protocols are routing protocols based on link-state advertisements. Examples of link state protocols include ISIS and OSPF. Characteristics of link-state protocols include the advertising by each node of its local connectivity to the rest of the other nodes. Therefore, Edge Devices and other routers within an Autonomous System (AS) such as a customer network site may communicate with one another by sending advertisements via an IGP such as IS-IS.

In the following example, processes are described with reference to those receivers in a first site that are local to the Source, but remotely located with respect to a multicast router. The processes performed with respect to receivers that are remotely located with respect to the Source will not be discussed, since these processes will not be modified.

Figure 2:
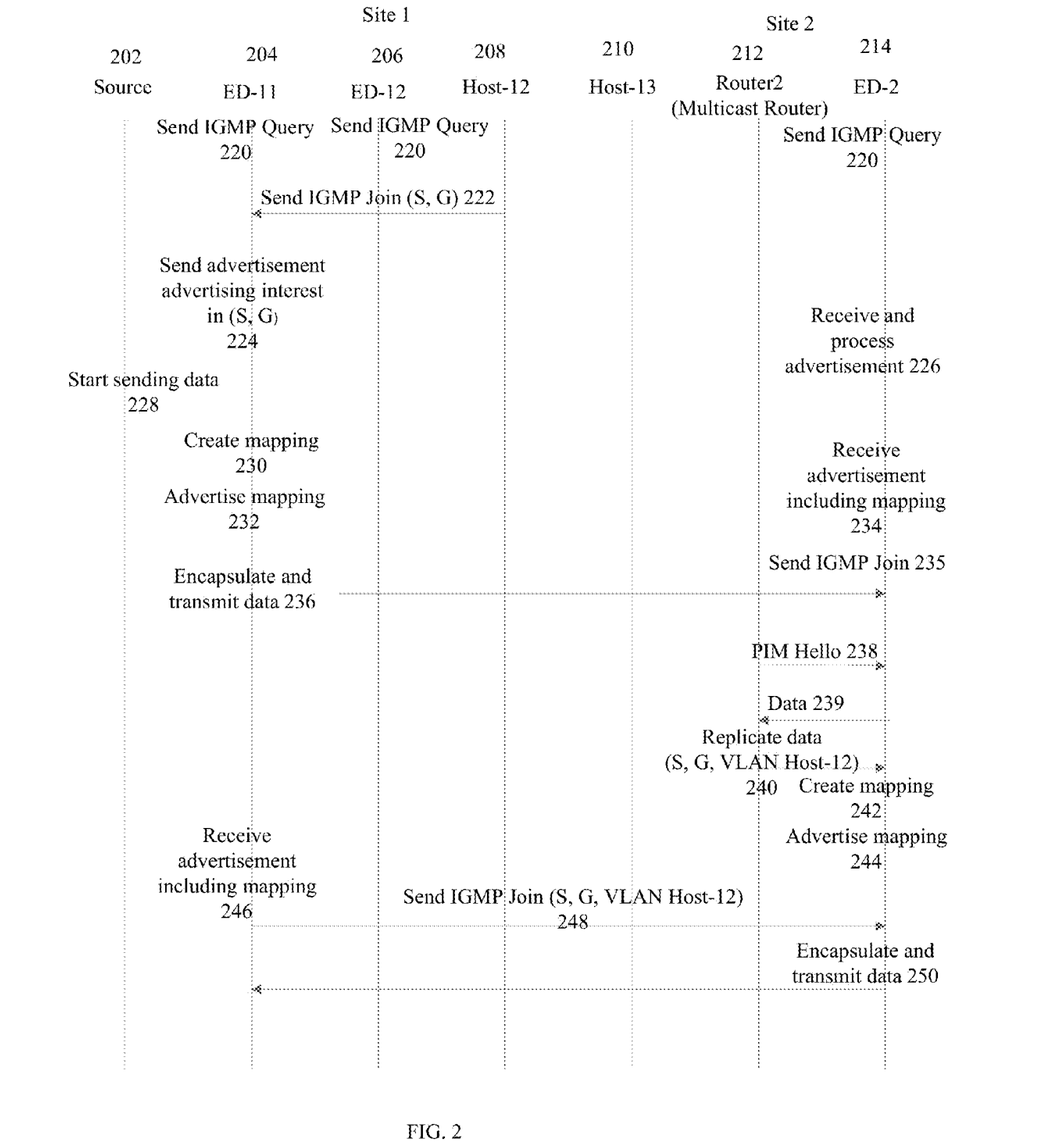
FIG. 2 is a transaction flow diagram illustrating an example method of transmitting multicast traffic to a first receiver shown in FIG. 1B.

FIG. 2 is a transaction flow diagram illustrating an example method of implementing the disclosed embodiments to transmit multicast traffic to a first receiver shown in FIG. 1B. Steps performed by Source, ED-11, ED-12, Host-12, Host-13, Router2, and ED-2 will be described with reference to vertical lines 202, 204, 206, 208, 210, 212, 214, respectively. First, at 220, each of the Edge Devices, ED-11, ED-12, and ED-2 may send either an IGMP query or a PIM Hello to attract multicast traffic. Through this process, the Edge Devices may advertise themselves as Edge Devices for their respective sites.

At 222, a first receiver such as Host-12 may send an IGMP Join toward the multicast router, Router 2, identifying the multicast source, Source. In addition, the IGMP Join may also identify the multicast group in order for the first receiver to attract multicast traffic from the multicast router, Router 2.

The first Edge Device, ED-11, intercepts the IGMP Join at 224 and advertises interest in the multicast traffic transmitted by the multicast source, Source, directed to multicast group, G. This may be accomplished by sending an advertisement, which may include an IS-IS packet including identifying the Source and the Group in an Overlay Transport Virtualization (OTV) Type Length Value (TLV) (e.g., extension).

When the Edge Device in the second site including the multicast router, the third Edge Device, ED-2, receives and processes the advertisement (e.g., IS-IS packet) at 226, it recognizes that the first Edge Device, ED-11, is interested in joining the multicast group, G. Therefore, the third Edge Device also recognizes that there is a receiver for traffic transmitted by the multicast source, Source, directed to the multicast group G coupled to the first Edge Device, ED-11.

The Source may begin sending multicast traffic (e.g. data) at 228. When the first Edge Device, ED-11, receives the multicast traffic from the Source, it creates a mapping at 230 for the Source and the multicast group, G, to enable the multicast traffic to be encapsulated by the first Edge Device, ED-11. More particularly, the multicast source, Source, may be mapped to the Edge Device coupled to the Source, the first Edge Device, ED-11. In addition, the Group may be mapped to a VLAN supported by the Source, VLAN 100. The first Edge Device, ED-11, may then advertise these mappings of (VLAN100, S, G) to (ED-11, DG1) at 232 via an IS-IS TLV to the other Edge Devices in the customer network (e.g., ED-11, ED-12, and ED-2). More particularly, the advertisement may trigger the sending of an IGMP Join of (ED11, DG1) by the third Edge Device ED-2, which is interested in receiving multicast traffic from (VLAN100, S, G). The first Edge Device, ED-11, may then encapsulate the multicast traffic at 236 such that the header identifies a Source as the first Edge Device, ED-11, and a Destination as VLAN 100. The multicast traffic is then transmitted over the network (e.g., WAN) to the third Edge Device, ED-2.

When the Edge Device in the second site including the multicast router, the third Edge Device, ED-2, receives the advertisement at 234 from the first Edge Device, ED-11, it recognizes that there is a listener for VLAN 100. In addition, the third Edge Device, ED-2, also receives a PIM hello at 238 from the multicast router, Router 2, enabling the multicast router to receive multicast traffic sent on each VLAN supported by the multicast router. In this example, the multicast router, Router 2, supports VLAN 100, VLAN 200, and VLAN 300. As described above with reference to 234-235, upon receiving a mapping of (VLAN100, S, G) to (ED-11, DG1) advertised via IS-IS from the first Edge Device ED-11, the third Edge Device ED-2 will send an IGMP Join of (ED-11, DG1).

Since the first receiver, Host-12, had previously sent an IGMP Join at 222 toward the multicast router, the multicast router, Router 2, recognizes the multicast traffic received at 239 from the third Edge Device, ED-2, and replicates the multicast traffic received from the Source directed to multicast group G on the VLAN of the first receiver, VLAN 200, at 240.

When the third Edge Device, ED-2, receives the multicast traffic from the multicast router, Router 2, it may create a mapping at 242 for the multicast Source, multicast group G, and the VLAN of the first receiver, VLAN 200, to the third Edge Device, ED-2, and the VLAN of the third Edge Device, VLAN 200. The third Edge Device, ED-2, may advertise the mapping accordingly (e.g., via an IS-IS OTV TLV) at 244. In this example, this mapping takes the form of (VLAN 200, S,G) mapped to (ED-2, DG2). Upon receiving the advertised mapping at 246 from the third Edge Device, ED-2, the first Edge Device, ED-11, may join the multicast group G by sending an IGMP join at 248 identifying the multicast source, the third Edge Device ED-2 and the multicast group DG-2 to the third Edge Device, ED-2. The third Edge Device, ED-2, may then encapsulate and send the multicast traffic at 250 for the Source, Group, and VLAN 200, to the first Edge Device, ED-11.

In accordance with various embodiments, in order to eliminate unnecessary duplication, the Edge Device in the same site as the multicast source and coupled to the multicast source may recognize that the multicast traffic has one or more local receivers. More particularly, a local receiver may be a receiver that is in the same site as the multicast source. The Edge Device may therefore send the multicast traffic received from the multicast source to the local receiver(s). In this manner, the Edge Device may prevent duplicated delivery of the multicast traffic across the WAN (for the local receivers). Of course, the multicast traffic may still be delivered across the WAN for transmission to remote receivers (e.g., receivers in sites that are in a different site from the multicast source). The Edge Device may also guard against multicast traffic inadvertently being sent back to it across the network (e.g., WAN), thereby preventing routing loops.

Figure 3:
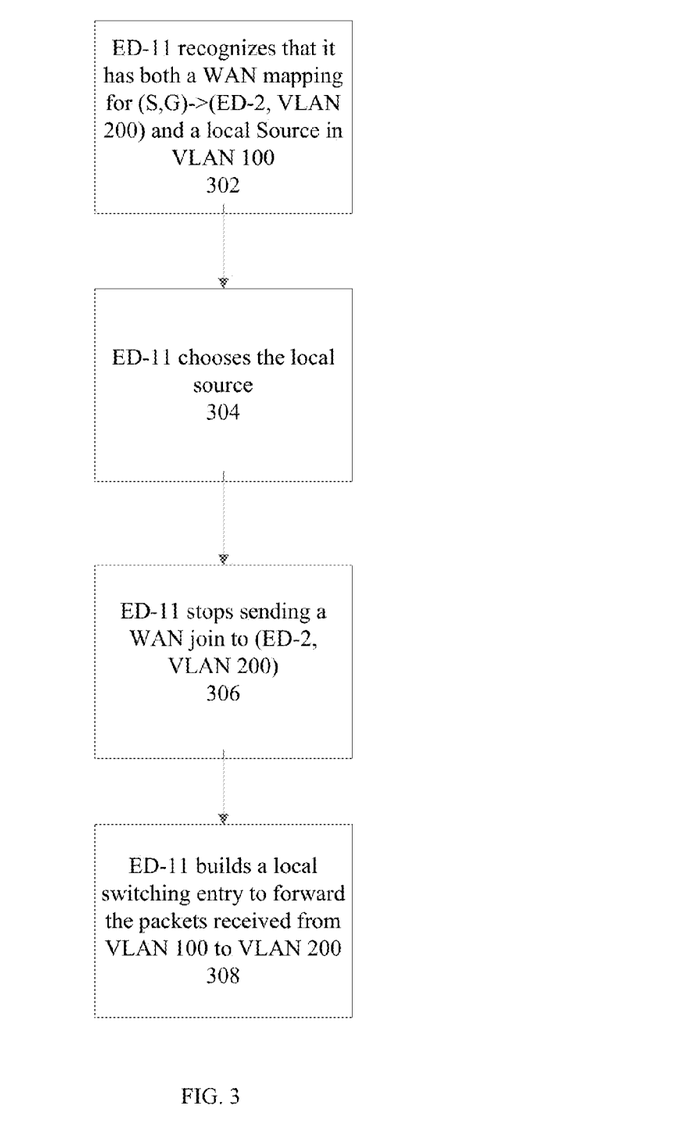
FIG. 3 is a process flow diagram illustrating an example method of implementing various embodiments in a first Edge Device, as shown in FIG. 1B.

FIG. 3 is a process flow diagram illustrating an example method of implementing various embodiments in a network device such as an Edge Device. The first Edge Device, ED-11, may recognize that it has two different multicast sources available to it: a first multicast source in a different network site from the first Edge Device, ED-11, and a second multicast source (i.e., local source) in the same network site as the first Edge Device, ED-11. More particularly, the first Edge Device, ED-11, may recognize a 1) WAN mapping for the multicast source, Source, and the multicast group G and 2) a local Source at 302. More particularly, in the example shown and described with reference to FIG. 1B and FIG. 2, the WAN mapping maps the Source to the third Edge Device, ED-2, and maps the Group to VLAN 200. The local Source in this example is in VLAN 100. The first Edge Device, ED-11, may recognize packets received from the local Source, and may choose the local Source at 304.

At 306, the first Edge Device, ED-11, may stop sending an IGMP join corresponding to (VLAN200, Source, Group) to the third Edge Device, ED-2, VLAN 200. The first Edge Device, ED-11, may also build a local switching entry at 308 to forward the packets received from VLAN 100 to VLAN 200. More particularly, the switching entry map may identify an input interface as VLAN 100 and an output interface as VLAN 200. When packets are transmitted from the local source in VLAN 100 to the first receiver, Host-12, in VLAN 200, the first Edge Device, ED-11, may replace a VLAN tag such that the VLAN tag identifies VLAN 200 rather than VLAN 100. Since the input interface for the multicast traffic is VLAN 100, duplicate traffic received over the WAN will be dropped.

Figure 4:
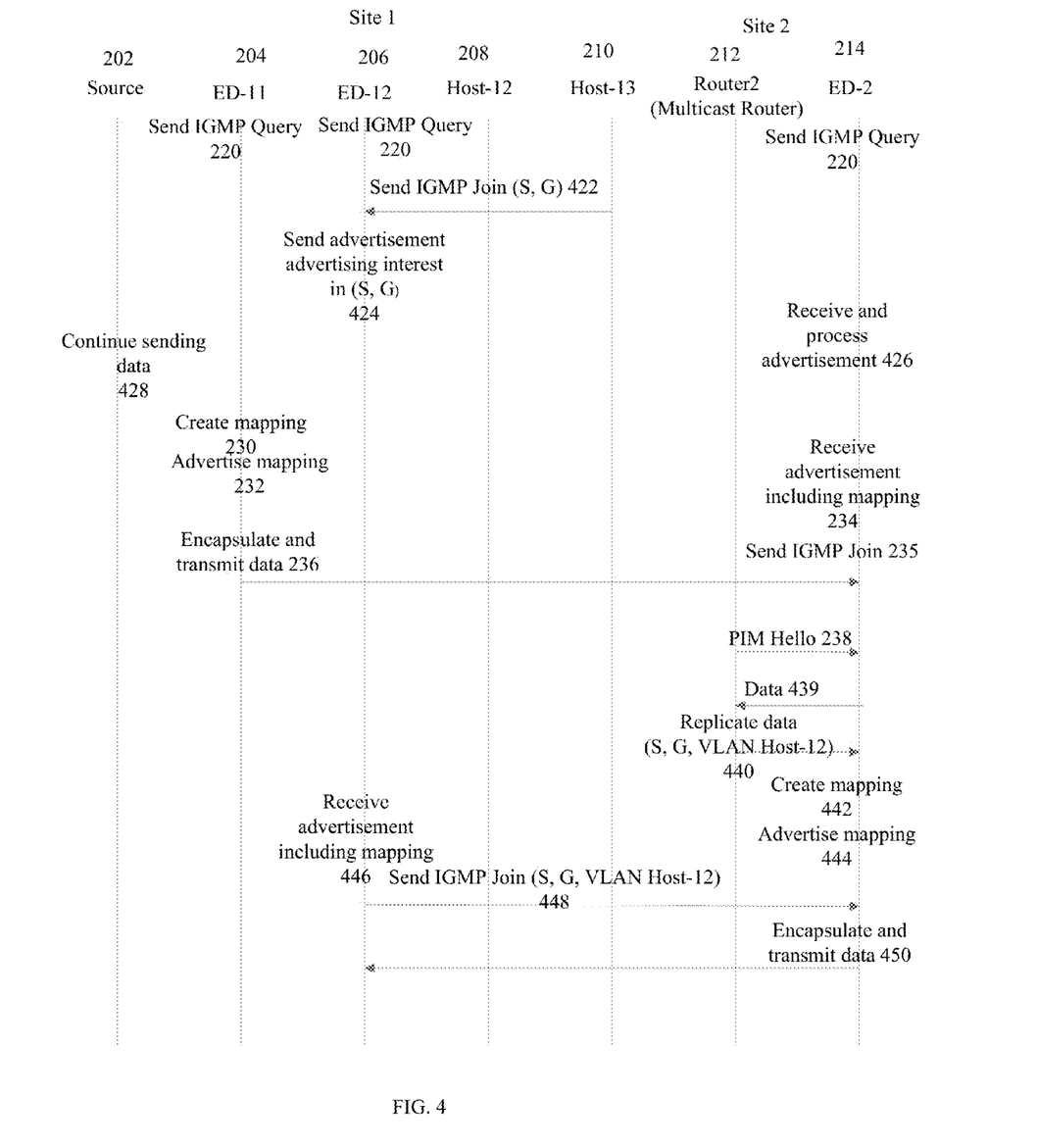
FIG. 4 is a transaction flow diagram illustrating an example method of transmitting multicast traffic to a second receiver as shown in FIG. 1B.

A process similar to that described above with respect to FIGS. 2-3 may be performed by one or more other Edge Devices in the first site for one or more additional receivers in the first site. Similarly, the process may be performed in additional sites other than the second site (including the multicast router). For example, FIG. 1B illustrates a second receiver, Host-13, coupled to a second Edge Device, ED-12. FIG. 4 is a transaction flow diagram illustrating an example method of implementing the disclosed embodiments to transmit multicast traffic to a second receiver as shown in FIG. 1B. Continuing from the process described above with reference to FIG. 2, as described above, each of the Edge Devices, ED-11, ED-12, and ED-2 have sent either an IGMP query or a PIM Hello to attract multicast traffic.

At 422, a second receiver such as Host-13 may send an IGMP Join toward the multicast router, Router 2, identifying the multicast source, Source. In addition, the IGMP Join may also identify the multicast group in order for the first receiver to attract multicast traffic from the multicast router, Router 2.

The second Edge Device, ED-12, intercepts the IGMP Join at 424 and advertises interest in the multicast traffic transmitted by the multicast source, Source, directed to multicast group, G. This may be accomplished by sending an advertisement, which may include an IS-IS packet including identifying the Source and the Group in an OTV TLV.

When the Edge Device in the second site including the multicast router, the third Edge Device, ED-2, receives and processes the advertisement (e.g., IS-IS packet) at 426, it recognizes that the second Edge Device, ED-12, is interested in joining the multicast group, G. Therefore, the third Edge Device also recognizes that there is a receiver for traffic transmitted by the multicast source, Source, directed to the multicast group G coupled to the second Edge Device, ED-12.

The Source may continue sending multicast traffic (e.g. data) at 428.

When the Edge Device in the second site including the multicast router, the third Edge Device, ED-2, receives the advertisement at 436 from the first Edge Device, ED-11, it recognizes that there is a listener for VLAN 300. In addition, the third Edge Device, ED-2, has previously received a PIM hello at 238 from the multicast router, Router 2, enabling the multicast router to receive multicast traffic sent on each VLAN supported by the multicast router. In this example, the multicast router, Router 2, supports VLAN 100, VLAN 200, and VLAN 300.

Since the second receiver, Host-12, had previously sent an IGMP Join at 422 toward the multicast router, the multicast router, Router 2, recognizes the multicast traffic received at 439 from the third Edge Device, ED-2, and replicates the multicast traffic received from the Source directed to multicast group G on the VLAN of the second receiver, VLAN 300, at 440.

When the third Edge Device, ED-2, receives the multicast traffic from the multicast router, Router 2, it may create a mapping at 442 for the multicast Source, multicast group G, and the VLAN of the second receiver, VLAN 300, to the third Edge Device, ED-2 and the VLAN of the third Edge Device, VLAN 300. In this example, the mapping will take the form of (VLAN300, Source, Group) mapping to (ED-2, DG3). The third Edge Device, ED-2, may advertise the mapping accordingly (e.g., via an IS-IS OTV TLV) at 444. Upon receiving the advertised mapping at 446 from the third Edge Device, ED-2, the second Edge Device, ED-12, typically joins the multicast group G by sending an IGMP join at 448 identifying the mapped multicast source, the third Edge Device ED-2, and the mapped multicast group DG-3 to the third Edge Device, ED-2. The third Edge Device, ED-2, may then encapsulate and send the multicast traffic at 450 for the Source, Group, and VLAN 300, to the second Edge Device, ED-12.

Figure 5:
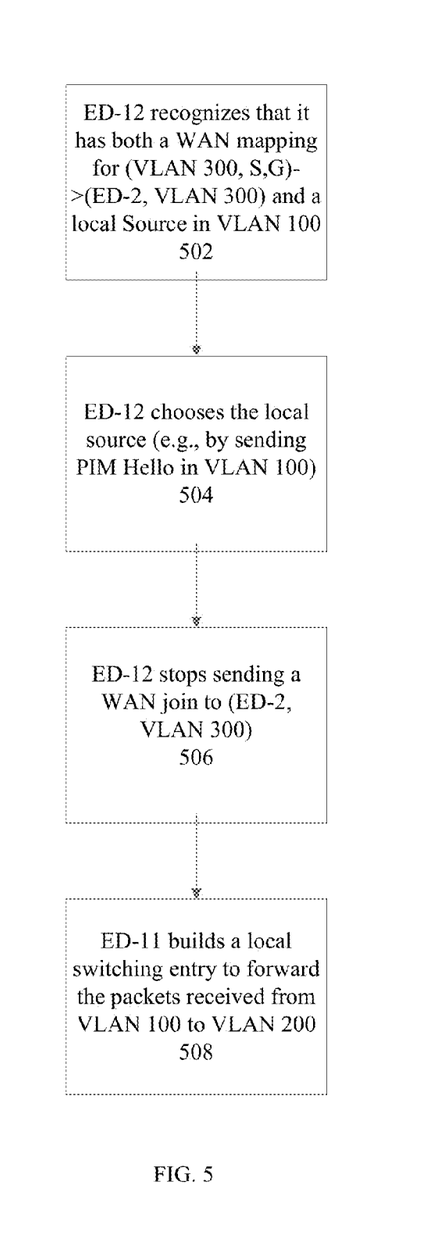
FIG. 5 is a process flow diagram illustrating an example method of implementing various embodiments in a second Edge Device, as shown in FIG. 1B.

FIG. 5 is a process flow diagram illustrating an example method of implementing various embodiments in a second Edge Device, as shown in FIG. 1B. The second Edge Device, ED-12, may recognize that it has two different multicast sources available to it: a first multicast source in a different network site from the second Edge Device, ED-12, and a second multicast source (i.e., local source) in the same network site as the first Edge Device, ED-11. More particularly, the second Edge Device, ED-12, may recognize that it has both 1) a WAN mapping for the multicast source, Source, and the multicast group G and 2) a local Source at 502. More particularly, in the example shown and described with reference to FIG. 1B and FIG. 4, the WAN mapping maps (VLAN 300, S, G) to (ED2, DG-3). Thus, the second Edge Device, ED-12, knows that its receiver, Host-13 (in VLAN 300), is allowed to receive the multicast packets for the multicast group G. As shown in FIG. 1B, the source in the first site (e.g., the local Source) in this example is in VLAN 100. The second Edge Device, ED-12, may recognize packets (e.g., advertisements) received from the local Source, and therefore detects that the local Source is local in VLAN 100. Therefore, the second Edge Device, ED-12, may send a message such as a PIM Hello in VLAN 100 (e.g., to the Source) to draw the multicast traffic to itself at 504.

At 506, the second Edge Device, ED-12, may stop sending an IGMP join identifying the mapping for VLAN 300 to the third Edge Device, ED-2, VLAN 200. The second Edge Device, ED-12, may also build a local switching entry at 508 to forward the packets received from VLAN 100 to VLAN 300. More particularly, the switching entry map may identify an input interface as VLAN 100 and an output interface as VLAN 300. When packets are transmitted from the local source in VLAN 100 to the receiver, Host-13, in VLAN 300, the second Edge Device, ED-12, may replace a VLAN tag such that the VLAN tag identifies VLAN 300 rather than VLAN 100. Since the input interface for the multicast traffic is VLAN 100, duplicate traffic received over the WAN will be dropped.

Figure 6:
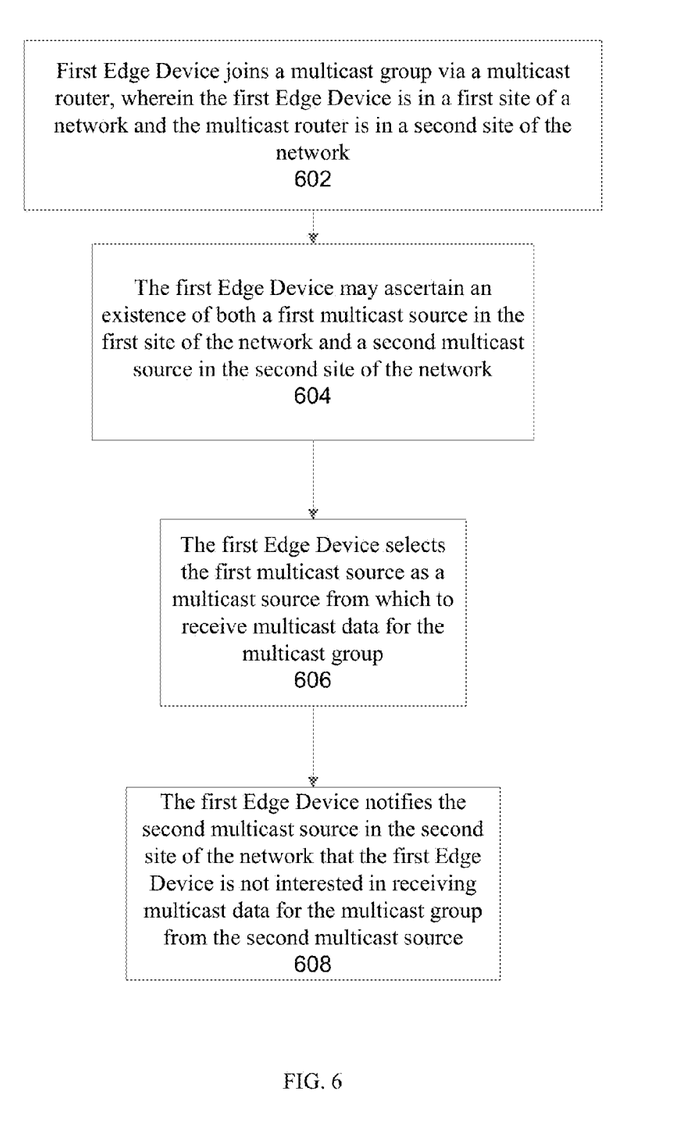
FIG. 6 is a process flow diagram illustrating an example method of implementing various embodiments by an Edge Device.

FIG. 6 is a process flow diagram illustrating an example method of implementing various embodiments by an Edge Device. A first Edge Device may join a multicast group via a multicast router at 602, wherein the first Edge Device is in a first site of a network and the multicast router is in a second site of the network. More particularly, the first Edge Device may send one or more join messages to a second Edge Device in the second site of the network, wherein the join message identifies a VLAN (e.g., VLAN of a receiver coupled to the first Edge Device) via which multicast packets are to be transmitted (e.g., to the receiver).

The first site may be in a first geographical location, while the second site may be in a second geographical location. For example, the first site may include a first LAN and the second site may include a second LAN, where the first site and the second site are connected via a WAN. The first LAN may support one or more VLANs, while the second LAN may also support the one or more VLANs.

The first Edge Device may become aware of a first multicast source in the first site. More particularly, the first Edge Device may receive a packet such as an advertisement from the first multicast source, enabling the first Edge Device to create a first mapping between the multicast group and the first multicast source. A VLAN from which the advertisement is sent may also be identified from the header of the packet.

In addition, the first Edge Device may receive multicast data from the second multicast source in the second site of the network. From this information, the first Edge Device may ascertain the existence of the second multicast source in the second site of the network. In addition, since the multicast data may be forwarded from the second multicast source via a second Edge Device in the second site, the first Edge Device may ascertain (e.g., from a header of the multicast data) an identity of the second Edge Device, enabling the first Edge Device to generate a second mapping between the multicast group and the second Edge Device in the second site of the network. A VLAN via which the multicast data is sent from the second Edge Device may also be identified from the header of the multicast data.

The first Edge Device may ascertain an existence of both a first multicast source in the first site of the network and a second multicast source in the second site of the network at 604. More particularly, the first Edge Device may recognize that the first Edge Device has both a first mapping between the multicast group and the first multicast source in the first site of the network, and a second mapping between the multicast group and a second Edge Device in the second site of the network (e.g., where the second Edge Device transmits multicast data from the second multicast source via a WAN to the first Edge Device). For example, the first mapping may identify a first VLAN for the first multicast source, and the second mapping may identify a second VLAN via which multicast data is to be received by the first Edge Device from the second Edge Device.

The first Edge Device may select the first multicast source at 606 as a multicast source from which to receive multicast data for the multicast group. More particularly, the first Edge Device may send a message to the first multicast source of the first site indicating that it has been selected as the multicast source from which the first Edge Device is to receive multicast data for the multicast group. This message may identify a VLAN of the first multicast source. In addition, the first Edge Device may build a switching entry to forward packets received from the first multicast source to a receiver via the VLAN of the receiver. Upon receiving multicast packets from the first multicast source, the first Edge Device may then forward the multicast packets to the receiver via the VLAN of the receiver using the switching entry.

The first Edge Device may also notify the second multicast source in the second site of the network at 608 that the first Edge Device is not interested in receiving multicast data for the multicast group from the second multicast source. More particularly, the first Edge Device may discontinue sending one or more join messages to the second Edge Device in the second site of the network. By notifying the second multicast source that it is not interested in receiving multicast data for the multicast group, the first Edge Device may discontinue transmission of multicast data for the multicast group from the second multicast source to the first Edge Device.

Multicast data may no longer be received from the second multicast source in the second site of the network after notifying the second multicast source that the first Edge Device is not interested in receiving multicast data for the multicast group from the second multicast source. In this manner, the transmission of multicast data may be optimized.

In the examples shown in FIG. 1A-B, receivers requesting multicast data are located in a network site that is separate from the multicast router. However, the disclosed embodiments are also applicable to systems having both a multicast source and a multicast router in the same site as one or more receivers.

Figure 7:
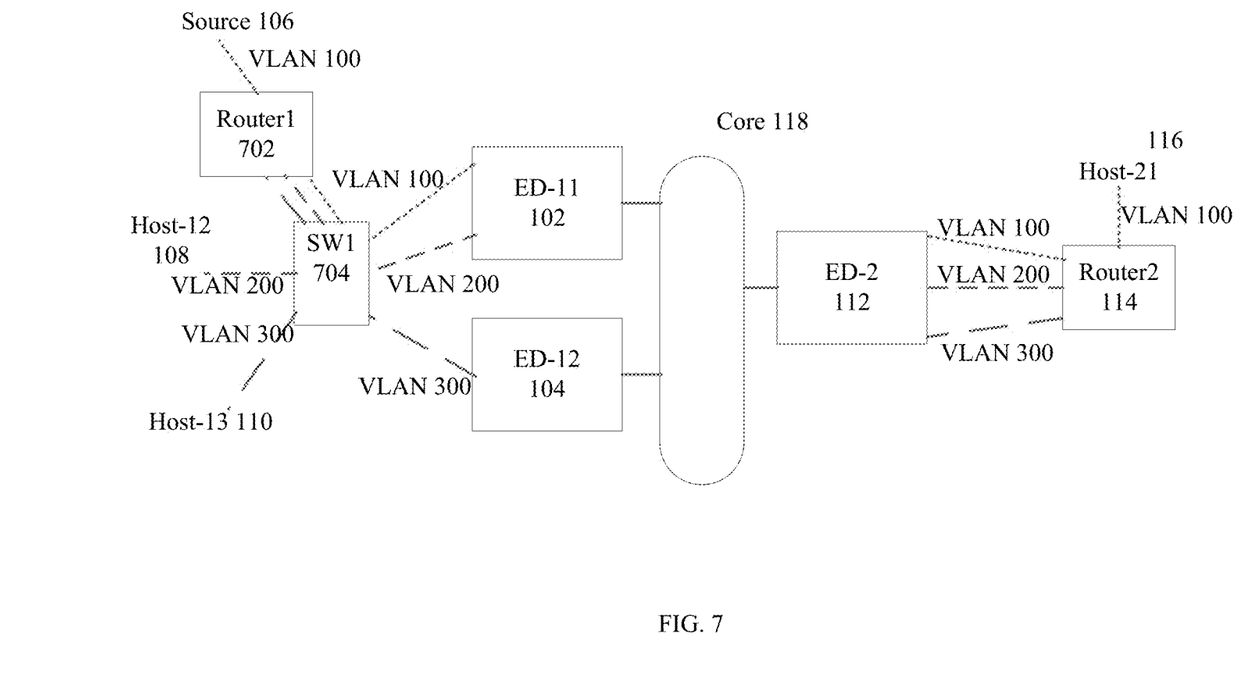
FIG. 7 is a diagram illustrating another example system in which the disclosed embodiments may be implemented.

FIG. 7 is a diagram illustrating another example system in which the disclosed embodiments may be implemented. As shown in this example, a multicast source is in the same site as a multicast router, Router1 702. In addition, a switch, SW1 704, may connect the receivers in the first site, Host-12 108 and Host-13 110, to the Edge Devices in the first site, ED-11 102 and ED-12 110. In addition, the switch, SW1 604, may be connected to the multicast router, Router1 602.

The disclosed embodiments have been described with reference to various example system configurations. However, it is important to note that these examples are merely illustrative. Therefore, the disclosed embodiments may be implemented in a wide variety of systems to optimize the transmission of multicast traffic where a receiver is in the same network site as a multicast source. For example, various example systems are described with reference to various VLANs. However, the disclosed embodiments may also be implemented in a network that does not implement one or more VLANs.

Generally, the techniques for performing the disclosed embodiments may be implemented on software and/or hardware. For example, they can be implemented in an operating system kernel, in a separate user process, in a library package bound into network applications, on a specially constructed machine, or on a network interface card. In a specific embodiment, the disclosed techniques are implemented in software such as an operating system or in an application running on an operating system.

A software or software/hardware hybrid packet processing system of the disclosed embodiments may be implemented on a general-purpose programmable machine selectively activated or reconfigured by a computer program stored in memory. Such programmable machine may be a network device designed to handle network traffic. Such network devices typically have multiple network interfaces. Specific examples of such network devices include routers, switches, and access points. For example, the packet processing systems of the disclosed embodiments may be implemented via wireless controller models 4400 series and 2006 series, and access points models 1000 series and 12xx series available from Cisco Systems, Inc. of San Jose, Calif. The network devices may be specially configured routers such as specially configured router models 1600, 2500, 2600, 3600, 4500, 4700, 7200, 7500, 12000 and Carrier Routing System (CRS) available from Cisco Systems, Inc. of San Jose, Calif. A general architecture for some of these machines will appear from the description given below. Further, the disclosed embodiments may be at least partially implemented on a card (e.g., an interface card) for a network device or a general-purpose computing device.

Figure 8:
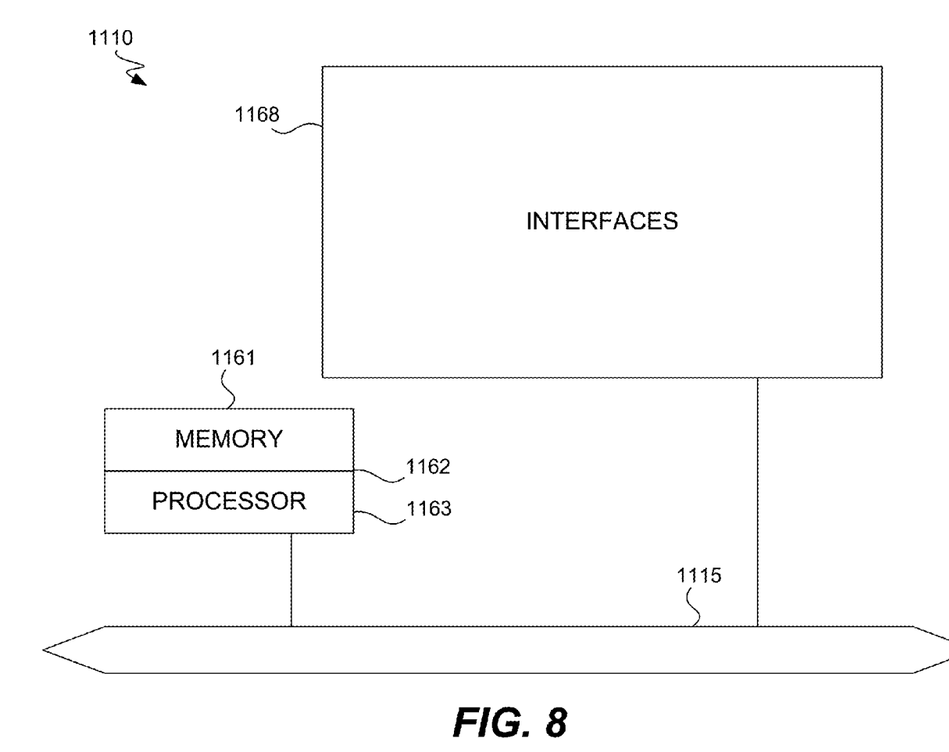
FIG. 8 is a diagrammatic representation of an example network device in which various embodiments may be implemented.

An Edge Device implementing the disclosed embodiments may be a network device such as a router or switch. In one embodiment, a network device implementing the disclosed embodiments is a router. Referring now to FIG. 8, a router 1110 suitable for implementing the disclosed embodiments includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for implementing the disclosed embodiments, in whole or in part. The router may accomplish these functions under the control of software including an operating system (e.g., the Internetwork Operating System (IOS®) of Cisco Systems, Inc.) and any appropriate applications software. CPU 62 may include one or more processors 1163 such as a processor from the Motorola family of microprocessors or the MIPS family of microprocessors. In an alternative embodiment, processor 1163 is specially designed hardware for controlling the operations of router 10. In a specific embodiment, a memory 1161 (such as non-volatile RAM and/or ROM) also forms part of CPU 1162. However, there are many different ways in which memory could be coupled to the system. Memory block 1161 may be used for a variety of purposes such as, for example, caching and/or storing data, programming instructions, etc.

The interfaces 1168 are typically provided as interface cards (sometimes referred to as "line cards"). Generally, they control the sending and receiving of data packets or data segments over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, Asynchronous Transfer Mode (ATM) interfaces, High-Speed Serial Interface (HSSI) interfaces, Packet over Synchronous Optical Network (POS) interfaces, Fiber Distributed Data Interface (FDDI) interfaces, Local Area Network (LAN) interfaces, Wireless Area Network (WAN) interfaces, metropolitan area network (MAN) interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 8 is one specific router that may be used to implement the disclosed embodiments, it is by no means the only router architecture on which the disclosed embodiments can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 1165) configured to store data, program instructions for the general-purpose network operations and/or the inventive techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the disclosed embodiments, and these variations would become clear to those of ordinary skill in the art after perusal of this application. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:
   joining by a first Edge Device a multicast group via a multicast router, wherein the first Edge device is in a first site of a network comprising a first local area network (LAN) and the multicast router is in a second site of the network comprising a second LAN with the first LAN and second LAN being different LANs;
   ascertaining by the first Edge Device an existence of both a first multicast source for the multicast group in the first site of the network and a second multicast source for the multicast group in the second site of the network;
   selecting by the first Edge Device the first multicast source as a multicast source from which to receive multicast data for the multicast group; and
   notifying by the first Edge Device the second multicast source in the second site of the network that the first Edge Device is not interested in receiving multicast data for the multicast group from the second multicast source.

2. The method as recited in claim 1, further comprising:
   receiving by the first Edge Device multicast data from the second multicast source for the multicast group in the second site of the network;
   wherein notifying includes discontinuing transmission of multicast data for the multicast group from the second multicast source for the multicast group to the first Edge Device;
   wherein multicast data is no longer received from the second multicast source for the multicast group in the second site of the network after notifying the second multicast source for the multicast group that it is not interested in receiving multicast data for the multicast group from the second multicast source for the multicast group.

3. The method as recited in claim 1, wherein the second multicast source for the multicast group includes a second Edge Device in the second site of the network, the second Edge Device being coupled to the multicast router, wherein joining comprises:
   sending one or more join messages to the second Edge Device in the second site of the network, wherein the join message identifies a VLAN via which multicast packets are to be transmitted.

4. The method as recited in claim 3, wherein notifying comprises:
   discontinuing by the first Edge Device sending one or more join messages to the second Edge Device in the second site of the network.

5. The method as recited in claim 4, wherein selecting comprises building a switching entry by the first Edge Device to forward packets received from the first multicast source for the multicast group to a receiver via the VLAN, the method further comprising:
   receiving multicast packets by the first Edge Device from the first multicast source for the multicast group; and
   forwarding the multicast packets by the first Edge Device to the receiver via the VLAN using the switching entry.

6. The method as recited in claim 1, wherein the second multicast source for the multicast group includes a second Edge Device in the second site of the network, the second Edge Device being coupled to the multicast router, wherein ascertaining comprises:
   recognizing that the first Edge Device has both a first mapping between the multicast group and the first multicast source for the multicast group in the first site of the network, and a second mapping between the multicast group and the second Edge Device in the second site of the network.

7. The method as recited in claim 6, wherein the first mapping identifies a first VLAN for the first multicast source for the multicast group, and wherein the second mapping identifies a second VLAN via which multicast data is to be received by the first Edge Device from the second Edge Device.

8. The method as recited in claim 1, wherein selecting comprises:
   sending a message to the first multicast source for the multicast group indicating that it has been selected as the multicast source for the multicast group from which the first Edge Device is to receive multicast data for the multicast group.

9. The method as recited in claim 8, wherein the message is sent via a VLAN of the first multicast source for the multicast group.

10. An apparatus, comprising:
    a processor; and
    a memory, at least one of the processor or the memory being adapted for:
    joining by a first Edge Device a multicast group via a multicast router, wherein the first Edge device is in a first site of a network comprising a first local area network (LAN) and the multicast router is in a second site of the network comprising a second LAN with the first LAN and second LAN being different LANs;

ascertaining by the first Edge Device an existence of both a first multicast source for the multicast group in the first site of the network and a second multicast source for the multicast group in the second site of the network;

selecting by the first Edge Device the first multicast source as a multicast source from which to receive multicast data for the multicast group; and notifying by the first Edge Device the second multicast source in the second site of the network that the first Edge Device is not interested in receiving multicast data for the multicast group from the second multicast source.

11. The apparatus as recited in claim 10, at least one of the processor or the memory being further adapted for:

receiving by the first Edge Device multicast data from the second multicast source for the multicast group in the second site of the network;

wherein notifying includes discontinuing transmission of multicast data for the multicast group from the second multicast source for the multicast group to the first Edge Device;

wherein multicast data is no longer received from the second multicast source for the multicast group in the second site of the network after notifying the second multicast source for the multicast group that it is not interested in receiving multicast data for the multicast group from the second multicast source for the multicast group.

12. The apparatus as recited in claim 10, wherein the second multicast source for the multicast group includes a second Edge Device in the second site of the network, the second Edge Device being coupled to the multicast router, wherein joining comprises:

sending one or more join messages to the second Edge Device in the second site of the network, wherein the join message identifies a VLAN via which multicast packets are to be transmitted.

13. The apparatus as recited in claim 12, wherein the second multicast source for the multicast group includes a second Edge Device in the second site of the network, the second Edge Device being coupled to the multicast router, wherein notifying comprises:

discontinuing by the first Edge Device sending one or more join messages to the second Edge Device in the second site of the network.

14. The apparatus as recited in claim 13, wherein selecting comprises building a switching entry by the first Edge Device to forward packets received from the first multicast source for the multicast group to a receiver via the VLAN, at least one of the processor or the memory being further adapted for:

receiving multicast packets by the first Edge Device from the first multicast source for the multicast group; and forwarding the multicast packets by the first Edge Device to the receiver via the VLAN using the switching entry.

15. The apparatus as recited in claim 10, wherein the second multicast source for the multicast group includes a second Edge Device in the second site of the network, the second Edge Device being coupled to the multicast router, wherein ascertaining comprises:

recognizing that the first Edge Device has both a first mapping between the multicast group and the first multicast source for the multicast group in the first site of the network, and a second mapping between the multicast group and the second Edge Device in the second site of the network.

16. The apparatus as recited in claim 15, wherein the first mapping identifies a first VLAN for the first multicast source for the multicast group, and wherein the second mapping identifies a second VLAN via which multicast data is to be received by the first Edge Device from the second Edge Device.

17. The apparatus as recited in claim 10, wherein selecting comprises:

sending a message to the first multicast source for the multicast group indicating that it has been selected as the multicast source for the multicast group from which the first Edge Device is to receive multicast data for the multicast group.

18. The apparatus as recited in claim 17, wherein the message is sent via a VLAN of the first multicast source for the multicast group.

19. A non-transitory computer-readable medium storing thereon computer-readable instructions, comprising:

instructions for joining by a first Edge Device a multicast group via a multicast router, wherein the first Edge device is in a first site of a network comprising a first local area network (LAN) and the multicast router is in a second site of the network comprising a second LAN with the first LAN and second LAN being different LANs;

instructions for ascertaining by the first Edge Device an existence of both a first multicast source for the multicast group in the first site of the network and a second multicast source for the multicast group in the second site of the network;

instructions for selecting by the first Edge Device the first multicast source as a multicast source from which to receive multicast data for the multicast group; and instructions for notifying by the first Edge Device the second multicast source in the second site of the network that the first Edge Device is not interested in receiving multicast data for the multicast group from the second multicast source.

20. The non-transitory computer-readable medium as recited in claim 19, wherein the second multicast source for the multicast group includes a second Edge Device in the second site of the network, the second Edge Device being coupled to the multicast router, wherein the instructions for joining comprise:

instructions for sending one or more join messages to the second Edge Device in the second site of the network, wherein the join message identifies a VLAN via which multicast packets are to be transmitted.

21. The non-transitory computer-readable medium as recited in claim 19, wherein the second multicast source for the multicast group includes a second Edge Device in the second site Edge Device being coupled to the multicast router, wherein the instructions for notifying comprise:

instructions for discontinuing by the first Edge Device sending one or more join messages to the second Edge Device in the second site of the network.

22. The non-transitory computer-readable medium as recited in claim 19, wherein the instructions for selecting comprise:

instructions for sending a message to the first multicast source for the multicast group indicating that it has been selected as the multicast source from which the first Edge Device is to receive multicast data for the multicast group.

23. The non-transitory computer-readable medium as recited in claim 19, wherein the second multicast source for the multicast group includes a second Edge Device in the second site of the network, the second Edge Device being coupled to the multicast router, wherein the instructions for ascertaining comprise:
- instructions for recognizing that the first Edge Device has both a first mapping between the multicast group and the first multicast source for the multicast group in the first site of the network, and a second mapping between the multicast group the second Edge Device in the second site of the network.

24. An apparatus, comprising:
- means for joining by a first Edge Device a multicast group via a multicast router, wherein the first Edge device is in a first site of a network comprising a first local area network (LAN) and the multicast router is in a second site of the network comprising a second LAN with the first LAN and second LAN being different LANs;
- means for ascertaining by the first Edge Device an existence of both a first multicast source for the multicast group in the first site of the network and a second multicast source for the multicast group in the second site of the network;
- means for selecting by the first Edge Device the first multicast source as a multicast source from which to receive multicast data for the multicast group; and
- means for notifying by the first Edge Device the second multicast source in the second site of the network that the first Edge Device is not interested in receiving multicast data for the multicast group from the second multicast source.

* * * * *